United States Patent
Namazkar et al.

(10) Patent No.: US 11,408,504 B1
(45) Date of Patent: Aug. 9, 2022

(54) TRANSITION CONTROL FOR LOW TORQUE UPSHIFTS OF AN AUTOMATIC TRANSMISSION

(71) Applicant: FORD GLOBAL TECHNOLOGIES, LLC, Dearborn, MI (US)

(72) Inventors: Mehran Namazkar, Dearborn, MI (US); Stephen Michael Cicala, Dearborn Heights, MI (US); Cory Benson LaRoche, Commerce Township, MI (US); Benjamin Rupley, Westland, MI (US); Spencer Johnson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/307,313

(22) Filed: May 4, 2021

(51) Int. Cl.
| | |
|---|---|
| F16H 61/00 | (2006.01) |
| F16H 61/30 | (2006.01) |
| F16H 59/54 | (2006.01) |
| F16H 59/78 | (2006.01) |
| F16H 59/14 | (2006.01) |
| F16H 63/34 | (2006.01) |

(52) U.S. Cl.
CPC ........... *F16H 61/30* (2013.01); *F16H 59/141* (2013.01); *F16H 59/54* (2013.01); *F16H 59/78* (2013.01); *F16H 61/0021* (2013.01); *F16H 63/3483* (2013.01); *F16H 2059/147* (2013.01)

(58) Field of Classification Search
CPC ........ F16H 59/141; F16H 59/54; F16H 59/78; F16H 2059/147; F16H 61/0021; F16H 61/30; B60W 10/06; B60W 10/11; B60W 2710/1077; B60W 2710/1083; B60W 2710/1088

See application file for complete search history.

(56) References Cited

U.S. PATENT DOCUMENTS

| | | | |
|---|---|---|---|
| 4,706,522 A | * | 11/1987 | Nitz ..................... F16H 59/141 477/154 |
| 6,994,647 B2 | | 2/2006 | Cicala et al. |
| 8,328,688 B2 | | 12/2012 | Fujii et al. |

(Continued)

FOREIGN PATENT DOCUMENTS

JP        4200679 B2       12/2008

*Primary Examiner* — Edwin A Young
(74) *Attorney, Agent, or Firm* — Vincent Mastrogiacomo; Brooks Kushman.P.C.

(57) ABSTRACT

According to one embodiment, a vehicle includes a transmission, a brake pedal, and a controller. The controller is programmed to, in response to an upshift of the transmission, a driver-demanded torque being zero, and the brake pedal being released, command a first pressure, that is greater than zero, to an oncoming shift element associated with the upshift such that the oncoming shift element has a torque capacity of zero, in response to the brake pedal being applied during the upshift of the transmission, command a second, larger pressure to the oncoming shift element to increase the torque capacity to a non-zero value, and, in response to expiration of a threshold time from the brake pedal being applied, command a series of sequentially ramping pressures to the oncoming shift element to further increase the torque capacity and lock the oncoming shift element.

20 Claims, 10 Drawing Sheets

(56) References Cited

U.S. PATENT DOCUMENTS

2006/0100060 A1* 5/2006 Kraska ................... B60K 6/405
477/156
2015/0308523 A1* 10/2015 Thornton ................ F16D 25/06
701/68

* cited by examiner

TRANSITION CONTROL FOR LOW TORQUE UPSHIFTS OF AN AUTOMATIC TRANSMISSION

TECHNICAL FIELD

This disclosure relates to shifting speed ratios of an automatic transmission of vehicle and more particularly to upshifts that are initiated when driver-demanded torque is low.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a higher speed ratio such that it multiplies the engine torque for improved acceleration. At high vehicle speed, operating the transmission at a lower speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

SUMMARY

According to one embodiment, a vehicle includes a transmission, a brake pedal, and a controller. The controller is programmed to, in response to an upshift of the transmission, a driver-demanded torque being zero, and the brake pedal being released, command a first pressure, that is greater than zero, to an oncoming shift element associated with the upshift such that the oncoming shift element has a torque capacity of zero, in response to the brake pedal being applied during the upshift of the transmission, command a second, larger pressure to the oncoming shift element to increase the torque capacity to a non-zero value, and, in response to expiration of a threshold time from the brake pedal being applied, command a series of sequentially ramping pressures to the oncoming shift element to further increase the torque capacity and lock the oncoming shift element.

According to another embodiment, a vehicle includes an engine, a transmission, and a controller. The controller is programmed to, during an upshift of the transmission when a driver-demanded torque is zero, command a first pressure to an oncoming shift element associated with the upshift without generating torque capacity on the oncoming shift element, in response to the driver-demanded torque increasing during the upshift of the transmission, command a second, larger pressure to the oncoming shift element to increase the torque capacity to a non-zero value, and, in response to the non-zero value being detected, command a series of pressures to the oncoming shift element that sequentially increase to further increase the torque capacity and lock the oncoming shift element.

According to yet another embodiment, a vehicle includes a transmission, a brake pedal, and a controller. The controller is programmed to, in response to an upshift of the transmission, a driver-demanded torque being zero, and the brake pedal being released, command a stroke pressure to an oncoming shift element associated with the upshift such that the oncoming shift element has a torque capacity of zero, in response to the brake pedal being applied during the upshift of the transmission, command another pressure to the oncoming shift element to increase the torque capacity to a non-zero value, and, in response to a difference between an estimated torque capacity of the oncoming shift element and the non-zero value being less than a threshold, command yet another pressure, that is larger than the another pressure, to oncoming shift element to further increase the torque capacity and lock the oncoming shift element.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
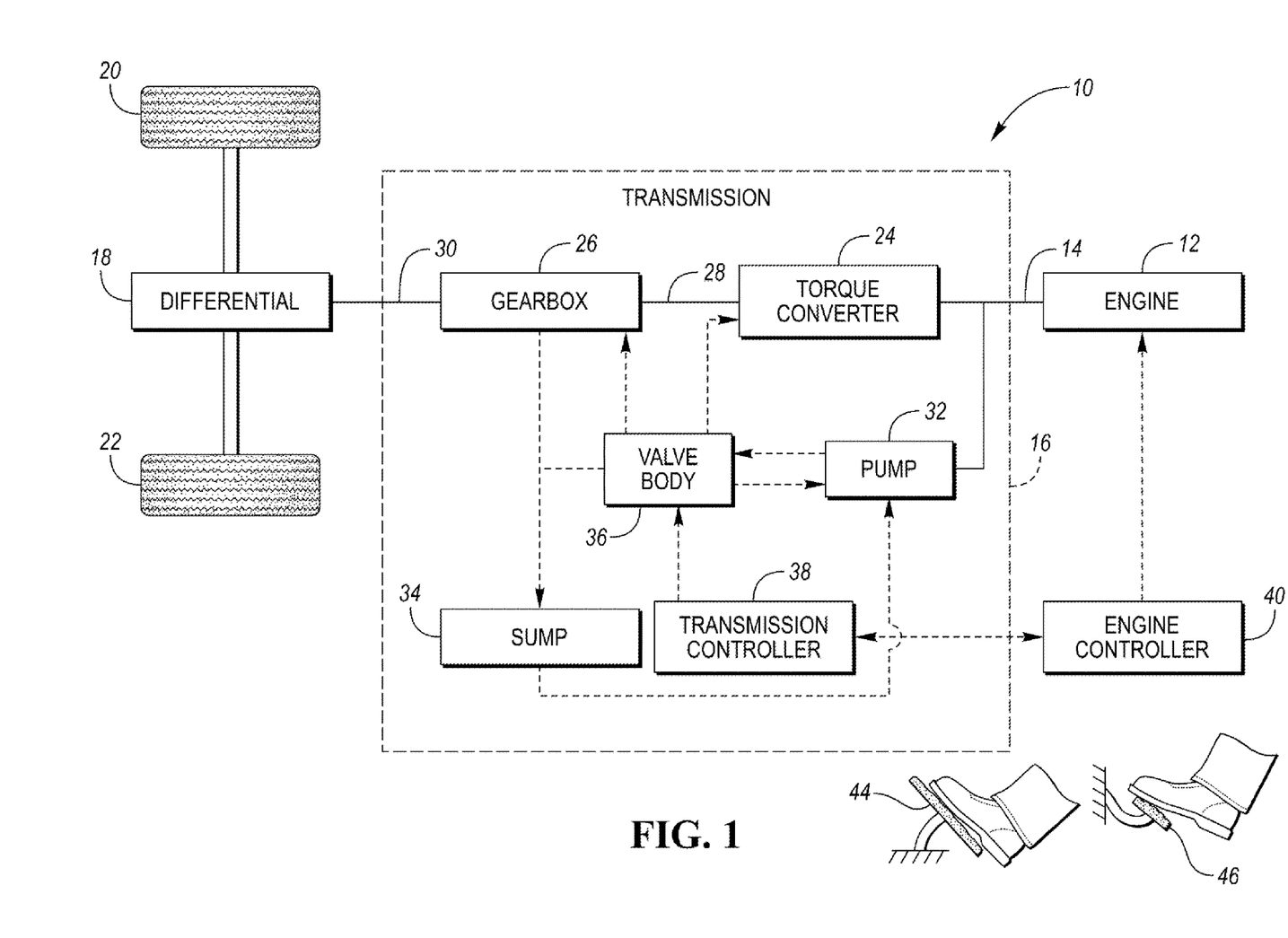
FIG. 1 is a schematic diagram of a vehicle powertrain.

FIG. 1 schematically illustrates a vehicle powertrain 10. Solid lines represent mechanical power flow connections; dashed lines represent the flow of hydraulic fluid or information signals. Power is provided by an actuator, such as internal combustion engine 12 or an electric motor. The transmission 16 adjusts the torque and speed to suit vehicle needs and delivers the power to a differential 18. The differential 18 transmits the power to left and right rear wheels 20 and 22, permitting slight speed differences as the vehicle turns a corner.

Transmission 16 includes a torque converter 24 and a gearbox 26. The torque converter 24 transmits torque hydrodynamically based on a speed difference between an impeller which is driven by crankshaft 14 and a turbine which drives a gearbox input shaft 28 (sometimes called a turbine shaft or a transmission input shaft). Power is transmitted from the impeller to the turbine via moving fluid whenever the impeller rotates faster than the turbine. The torque converter 24 may include a stator which redirects the fluid when the impeller is rotating substantially faster than the impeller such that the turbine torque is a multiple of the impeller torque. The gearbox 26 includes gearing and shift elements, e.g., clutches, configured to establish various power flow paths between the input shaft 28 and the output shaft 30. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The shift elements within the gearbox 26 are engaged by supplying hydraulic fluid at an elevated pressure to a shift element apply chamber. Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. A pump 32, driven by the crankshaft 14 or electrically, draws fluid from sump 34 and delivers it at an elevated pressure to a valve body 36. The valve body 36 delivers the fluid to the shift element apply chambers at a pressure controlled in accordance with signals from a transmission controller 38. In addition to the fluid provided to shift element apply chambers, the valve body provides fluid for lubrication and provides fluid to the torque converter 24. The fluid eventually drains from gearbox 26 back to sump 34 at ambient pressure.

An engine controller 40 adjusts various actuators in the engine 12 to control the level of torque delivered at the crankshaft. For example, the controller may adjust a throttle opening, fuel injection quantity and timing, spark timing, camshaft timing, or the like. The engine controller 40 may determine the desired level of wheel torque predominantly based on driver input via an accelerator pedal. The engine controller 40 is in communication with a transmission controller 38 and may adjust the torque output based on requests from the transmission controller 38. The engine controller 40 and the transmission controller 38 may be separate microprocessors communicating via a controller area network or their various functions may be combined into a single microprocessor or split among more than two microprocessors.

The controllers 38 and 40 may be part of a larger control system and may be controlled by various other controllers throughout the vehicle, such as a vehicle system controller (VSC). It should therefore be understood that the controller 38, 40 and one or more other controllers can collectively be referred to as a "controller" that controls various actuators in response to signals from various sensors to control functions such as shifting the transmission, controlling engine torque, etc. Any recital of "a controller" refers to one or more controller. The controller(s) may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle. The controller(s) communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

The vehicle 10 may include an accelerator pedal 44 and a brake pedal 46 that may be in communication one or more controllers, e.g., controllers 38 and/or 40. The accelerator pedal 44 may include a sensor configured to output an accelerator-pedal position signal. The controller is configured to interpret the signal as a driver-demanded torque. The controllers then configured to operate the engine to produce the driver-demanded torque during normal operation. During some situations, such as during a transmission shift, the controller may operate the engine to produce less than the driver-demanded torque, and in some instances, produce a negative engine torque. The brake pedal 46 may also include a sensor configured to output a brake-pedal position signal. The controller is configured to receive the brake-pedal position signal and determine a driver-requested braking torque that is commanded to the braking system of the vehicle.

Figure 2:
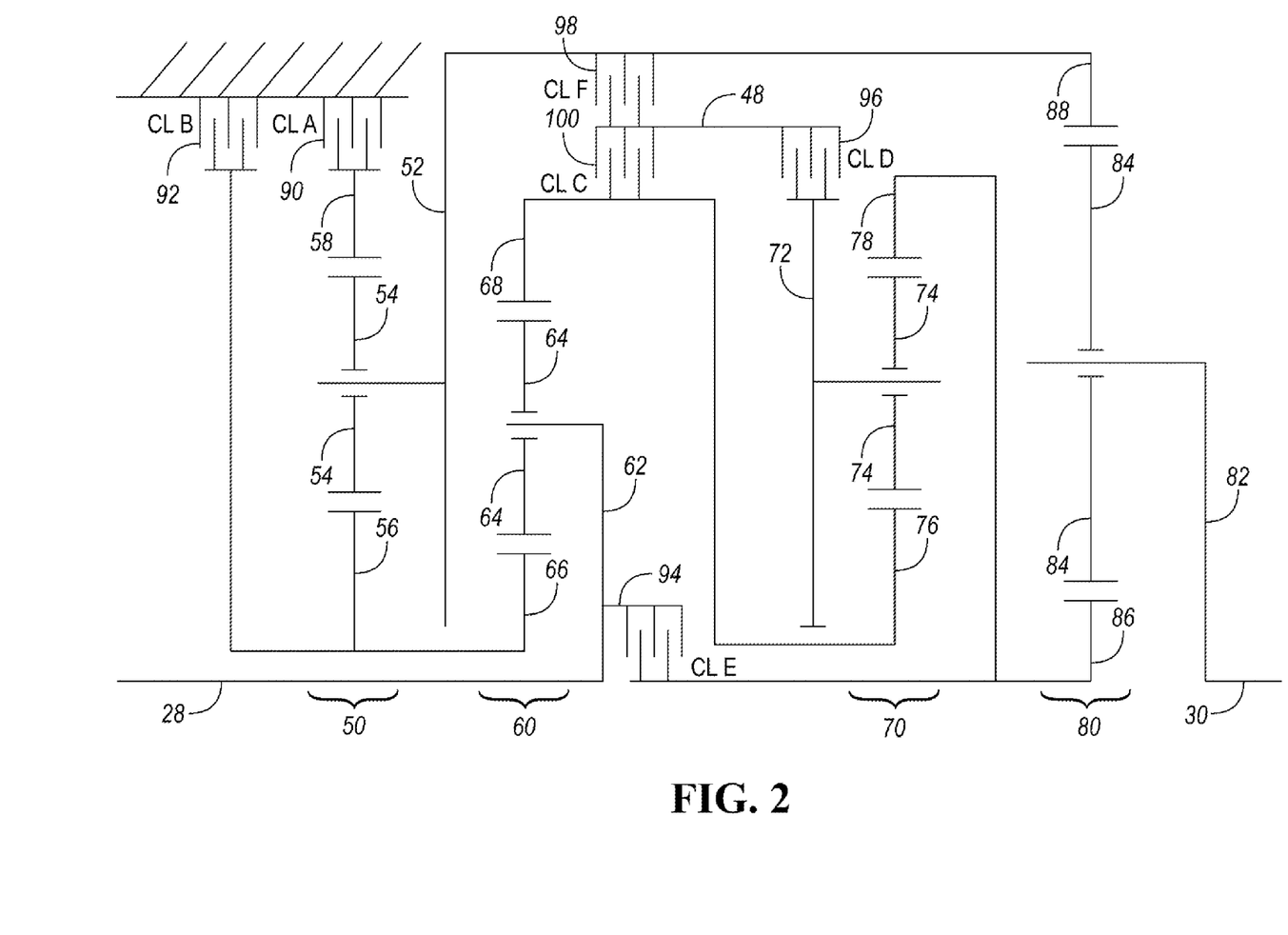
FIG. 2 is a schematic diagram of a transmission system.

An example automatic transmission gearbox is schematically illustrated in FIG. 2. The transmission utilizes four simple planetary gear sets 50, 60, 70, and 80. Sun gear 56 is fixedly coupled to sun gear 66, carrier 52 is fixedly couple to ring gear 88, ring gear 68 is fixedly coupled to sun gear 76, ring gear 78 is fixedly coupled to sun gear 86, turbine shaft 28 is fixedly coupled to carrier 62, and output shaft 30 is fixedly coupled to carrier 82. Ring gear 58 is selectively held against rotation by brake 90 and sun gears 56 and 66 are selectively held against rotation by brake 92. Turbine shaft 28 is selectively coupled to ring gear 78 and sun gear 86 by clutch 94. Intermediate shaft 48 is selectively coupled to carrier 72 by clutch 96, selectively coupled to carrier 52 and ring gear 88 by clutch 98, and selectively coupled to ring gear 68 and sun gear 76 by clutch 100. A suggested ratio of gear teeth for each planetary gear set is listed in Table 1.

TABLE 1

| | |
|---|---|
| Ring 58/Sun 56 | 2.20 |
| Ring 68/Sun 66 | 1.75 |
| Ring 78/Sun 76 | 1.60 |
| Ring 88/Sun 86 | 3.70 |

As shown in Table 2, engaging the clutches and brakes in combinations of four establishes ten forward speed ratios and one reverse speed ratio between turbine shaft 28 and output shaft 30. An X indicates that the clutch is required to establish the speed ratio. An (X) indicates the clutch can be applied but is not required to establish the power flow path. In $1^{st}$ gear, either clutch 98 or clutch 100 can be applied instead of applying clutch 96 without changing the speed ratio. When the gear sets have tooth numbers as indicated in Table 1, the speed ratios have the values indicated in Table 2.

TABLE 2

| | A 90 | B 92 | C 100 | D 96 | E 94 | F 98 | Ratio | Step |
|---|---|---|---|---|---|---|---|---|
| Rev | X | X |   | X |   | X | −4.79 | 102% |
| $1^{st}$ | X | X |   | (X) | X |   | 4.70 | |
| $2^{nd}$ | X | X | X | X |   |   | 2.99 | 1.57 |
| $3^{rd}$ | X |   | X | X | X |   | 2.18 | 1.37 |
| $4^{th}$ | X |   | X | X |   | X | 1.80 | 1.21 |
| $5^{th}$ | X |   | X |   | X | X | 1.54 | 1.17 |
| $6^{th}$ | X |   |   | X | X | X | 1.29 | 1.19 |
| $7^{th}$ |   |   | X | X | X | X | 1.00 | 1.29 |
| $8^{th}$ |   | X |   | X | X | X | 0.85 | 1.17 |
| $9^{th}$ |   | X | X |   | X | X | 0.69 | 1.24 |
| $10^{th}$ |   | X | X | X |   | X | 0.64 | 1.08 |

In operation, shift elements 90, 92, 96, and 94 may be engaged while the vehicle is stopped in Drive such that the vehicle is launched in first gear. When the vehicle reaches a sufficient speed, the transmission is shifted into second gear by releasing shift element 94 and engaging shift element 100. For this shift, shift element 94 is called the off-going element (OFG) and shift element 100 is called the oncoming element (ONC). To effectuate the shift, the controller adjusts the pressures supplied to the apply chambers of these two shift elements and modulates the engine torque.

During a drive cycle the transmission is frequently shifted to provide the optimum gear ratio for a given vehicle speed and driver demanded torque. To better describe these transmission shifts a lexicon has been developed to characterize different types of transmission shifts. For example, an upshift is where the transmission is switched from a lower gear to a higher gear, e.g., shifting from first gear to second gear, and downshifts are where the transmission shifts from a higher gear to a lower gear, e.g., shifting from third gear to second gear. One specific type of upshift is known as a low-input torque upshift (sometimes referred to as a ZIP shift) which characterizes an upshift that occurs when the driver-demanded torque is either zero or slightly above zero. During a ZIP shift (without transient conditions) the off-going shift element is released, the oncoming shift element is under-stroked, and the shift relies on negative engine torque to allow the engine and turbine to slowly free-fall to near end synchronization speed before applying the oncoming shift element. The result is a relatively lengthy shift, which is acceptable in this situation since driver-demanded torque is zero or low.

Difficulties may occur when the driver (or vehicle controller) changes conditions during execution of the ZIP shift, i.e., a mid-shift change of conditions. For example, the driver may tip-in on the accelerator pedal or apply the brake pedal. In this situation, the transmission controller must adapt the shift in order to provide the desired vehicle characteristics and mitigate driveline disturbances. Different transient conditions create different issues during a ZIP shift. For example, if a tip-in occurs the shift duration becomes problematic and if the brake pedal is applied the speed matching becomes difficult. More particularly, if a tip-in occurs during shift element stroke of a ZIP shift with a negative torque capacity torque command, it can be difficult to complete the shift element stroke quickly without bumping the shift element. If the brakes are applied, the ending synchronization speed will decrease such that the available negative engine torque is not low enough to pull turbine speed down quickly enough. In this case, the oncoming shift element needs to apply to help pull down turbine. This results in poor shift quality due to long delays.

Figure 3:
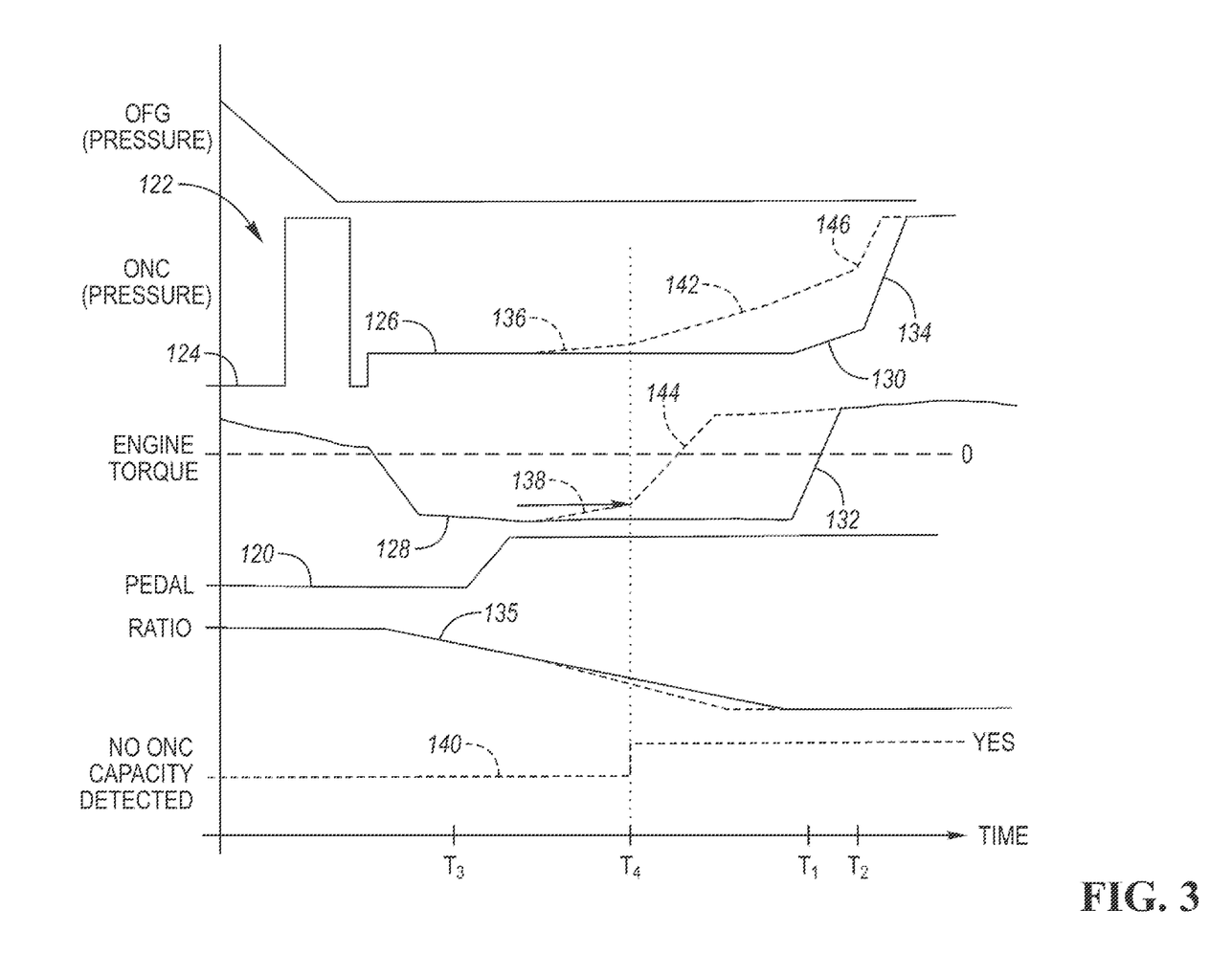
FIG. 3 is a series of plots of various parameters associated with a low-input torque transmission upshift having a mid-shift tip-in of the accelerator pedal.

FIG. 3 shows a ZIP shift having a mid-shift tip-in of the accelerator pedal. A ZIP shift control strategy without this invention is shown in solid and ZIP shift control strategy according to one or more aspects of this invention is shown in dashed. Unchanged parameters remain solid for both. The ZIP shift control strategy lacking the inventive aspects of this disclosure will be described first. When the shift begins, the accelerator pedal 120 is released triggering a ZIP shift. Accordingly, the off-going shift element is reduced to zero early in the shift (prior to the stroke phase of the oncoming shift element). A boost pressure 122 is commanded to the oncoming shift element 124 to begin filling the apply chamber with hydraulic fluid. Following the boost phase and a hysteresis phase, a stoke pressure 126 is commanded the oncoming shift element. The stroke pressure is insufficient to generate any torque capacity in the oncoming shift element. As such, the transmission is essentially in neutral during this time as both the oncoming shift element and the off going shift element do not have any torque carrying capacity. During the stroke phase, the driver tips in. Ideally, this would trigger an increase in the pressure commanded to the oncoming shift element. This is not done, however. Instead a timer is started in the stroke pressure 126 remains constant for a predetermined duration of time. During this time, a negative engine torque 128 decelerates the transmission input shaft (turbine shaft). Time T1 indicates the expiration of the predetermined time, and at this point, synchronization speed between the transmission input and output shafts are nearing. Now, the pressure applied to the oncoming shift element 124 is increased such that torque capacity is generated as shown by trace 130. Around the same time, the engine torque is increased as shown by trace 132. At time T2, the speeds are synchronized and the pressure applied to the oncoming shift element is ramped up to a holding pressure as shown by trace 134.

The above-described ZIP shift relies on calibration and predetermined durations to provide ensure a high-quality shift. Tip-in events are variable and, as such, predetermined durations and calibrations are conservative to provide adequate performance for a large range of conditions. This conservativeness result in longer shift times and decreased performance which is particularly noticed if the tip-in results in a high driver-demanded torque. As will be described below, in another control strategy, a torque capacity detection algorithm is employed to quickly increase torque clutch capacity without generating disturbances in response to accelerator pedal tip-in.

The second example ZIP shift is the same as the above described example until time T3 when the driver depresses the accelerator pedal, i.e., substantial increase in driver demanded torque. In response, the transmission controller is going to reduce the shift time by commanding torque capacity to the oncoming shift element sooner and increasing the engine torque sooner as shown by the dashed lines. This results in a quicker ratio change 135 and hence a faster shift. In response to the driver-demanded torque increasing during the upshift of the transmission, the stroke pressure 126 is increased as shown by trace 136. The pressure 136 slowly ramps up at a predetermined rate. The pressure 136 increases so that torque capacity of the oncoming shift element 124 will achieve a non-zero value, i.e., the shift element will have torque capacity. During the pressure increase 136, the engine torque is commanded to be less negative as shown by trace 138. At time T4, the transmission controller has detected that the oncoming shift element has torque capacity 140. In response, the pressure 142 commanded to the oncoming shift element 124 is increased to a second, higher ramp rate. At time T4, the engine torque 144 is also increased and commanded to have a positive torque. The ramping shift element pressure 142 continues until synchronous speed is achieved and then a holding pressure 146 is commanded to fully secure the oncoming shift element.

In comparing these two different control strategies, and can be seen that the second example provides a faster shift and the driver demanded torque sooner. This results in less vehicle lag and greater performance.

Figure 4:
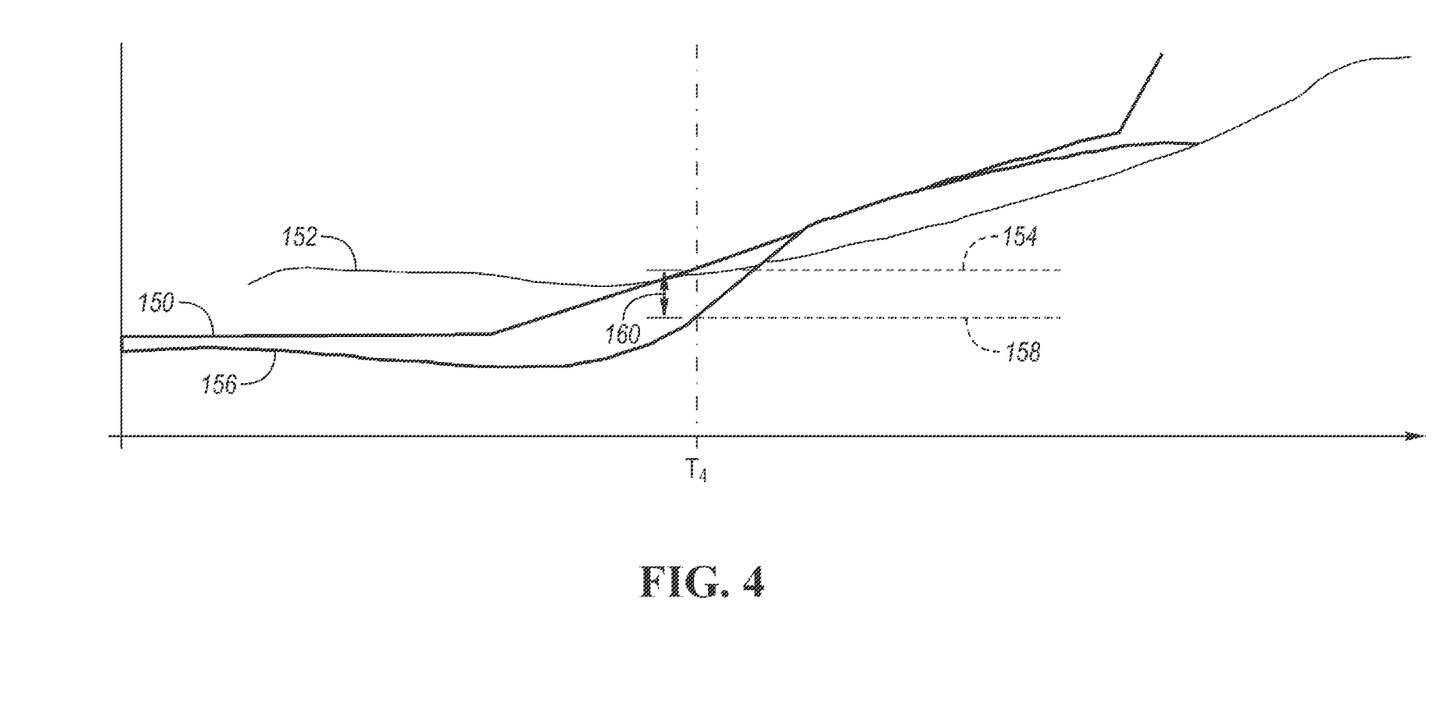
FIG. 4 is a series of plots indicating possible ways of detecting torque capacity at an oncoming shift element.

FIG. 4 illustrates several different ways the controller can detect torque capacity at the oncoming shift element. For example, torque capacity at the oncoming shift element may be detected (1) in response to the commanded shift-element capacity exceeding the transmission input shaft torque; (2) in response to commanded shift-element capacity exceeding a threshold; (3) in response to estimated shift-element capacity increasing above a threshold; or (4) in response to a difference between estimated shift-element capacity and commanded shift-element capacity being less than a threshold. The control logic may be configured to use one or more of these detection methods to determine when the capacity is detected. For example, the control logic may operate at least two of the detection methods to confirm detection of capacity.

Using the first detection method, it can be seen that at time T4 the commanded shift-element capacity 150 exceeds the transmission input shaft torque 152. Using the second detection method, it can be seen that at time T4, the commanded shift-element capacity 150 exceeds a threshold of 154. Using the third detection method, it can be seen at time T4, that the estimated shift-element capacity 156 has exceeded a threshold 158. Using the fourth detection method, and can be seen that at time T4, the difference 160 between the commanded torque 150 and the estimated shift-element capacity 158 exceeds a threshold.

Figure 5:
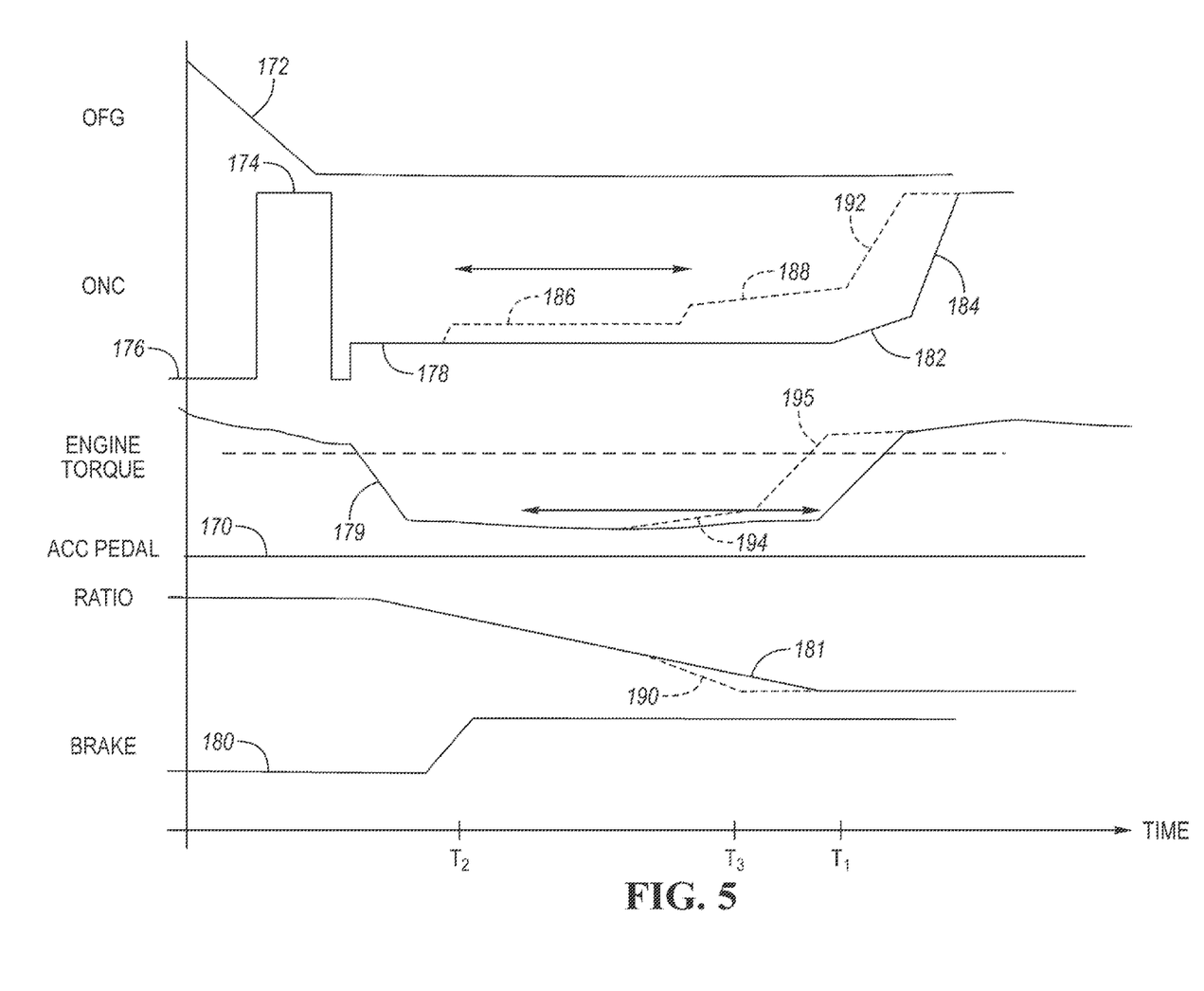
FIG. 5 is a series of plots of various parameters associated with a low-input torque transmission upshift having a mid-shift application of the brake pedal that occurs early in the shift.

FIG. 5 shows a ZIP shift having a mid-shift application of the brake pedal. A ZIP shift control strategy without this invention is shown in solid and ZIP shift control strategy according to one or more aspects of this invention is shown in dashed. Unchanged parameters remain solid for both. According this disclosure, the control strategy for the brake-apply case may be different depending upon when the brake pedal is pressed. For example, the controller may be programmed with an early brake-apply strategy and a late brake-apply strategy.

The ZIP shift control strategy lacking the inventive aspects of this disclosure will now be described. When the shift begins, the accelerator pedal 170 is released triggering a ZIP shift. Accordingly, the off-going shift element 172 is reduced to zero early in the shift (prior to the stroke phase of the oncoming shift element). A boost pressure 174 is commanded to the oncoming shift element 176 to begin filling the apply chamber with hydraulic fluid. Following the boost phase and a hysteresis phase, a stoke pressure 178 is commanded to the oncoming shift element. The stroke pressure 178 is insufficient to generate any torque capacity in the oncoming shift element. As such, the transmission is essentially in neutral during this time as both the oncoming shift element and the off going shift element do not have any torque carrying capacity. During the stroke phase, the brake pedal 180 is depressed. This creates speed synchronization issues between the transmission input and output shaft. The ZIP shift relies on the negative torque of the engine 179 to reduce the turbine speed into synchronization with the output shaft. When the brake is applied, the engine is not capable of producing enough negative torque to quickly synchronize the speeds. To account for this, the controller delays providing capacity to the oncoming shift element until time T1 which is when the ratio change 181 finally occurs. At time T1 the pressure commanded to the oncoming shift element is increased to a first ramp rate 182 and that a second ramp rate 184 to fully lock the oncoming shift element.

The early brake-apply strategy of this disclosure will now be described. Rather than taking no immediate action when the brake pedal is applied at time T2, the controls of this disclosure immediately increase the pressure commanded to the oncoming shift element 176 (as shown by trace 186) for a predetermined amount of time. The pressure is increased such that the oncoming shift element will achieve a nonzero capacity near the end of the predetermined time. The capacity at the oncoming shift element creates drag and helps the engine to pull down the turbine. This results in the ratio change 190 occurring sooner than in the ratio change 181. The predetermined amount of time expires at time T3, and the controller then commands a ramp pressure 188 to the oncoming shift element. This gradually increasing ramp pressure 188 is commanded until synchronous speed is achieved, at which point a second, higher ramp pressure 192 is commanded to fully lock the shift element. In these controls, the engine torque is increased from negative towards positive sooner than in the prior example. For example, the engine torque 179 may be increased as shown by trace 194 during the first predetermined amount of time and then increased at a second higher ramp 194 once the oncoming shift element achieves capacity. This allows the engine torque to become positive sooner than in the previous example.

Figure 6:
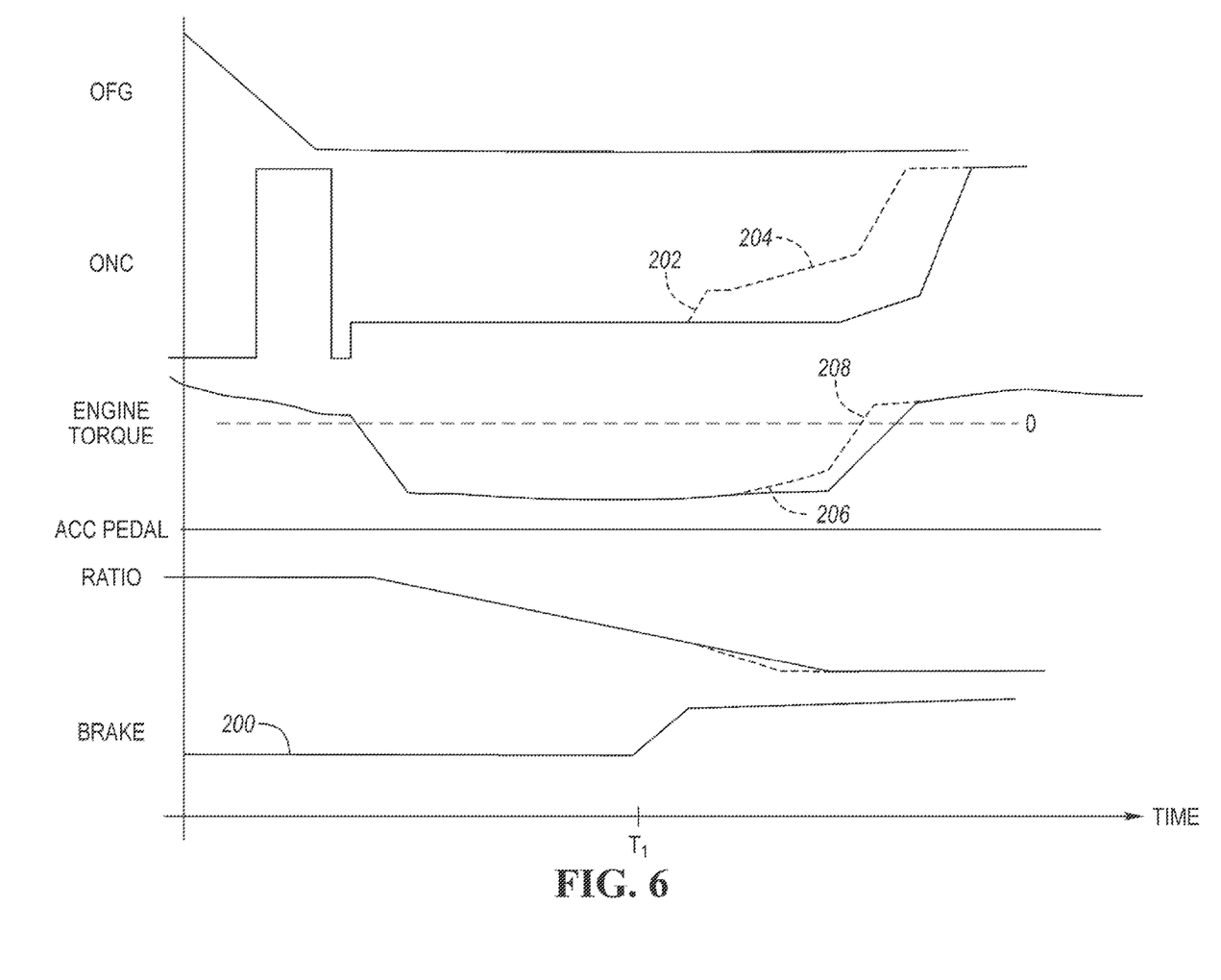
FIG. 6 is a series of plots of various parameters associated with a low-input torque transmission upshift having a mid-shift application of the brake pedal that occurs late in the shift.

FIG. 6 illustrates an example of the late brake-apply strategy. The figure illustrates the ZIP shift control strategy lacking the inventive aspects of this disclosure in solid. These controls are the same as FIG. 5 and will not be discussed again for brevity. At time T1, the brake pedal 200 is applied. In comparing with FIG. 4, the brake pedal of FIG. 6 is placed much later in the shift. This triggers the controller to use the late brake-apply strategy. In response to the brake pedal being applied late, the controller commands increased pressure 202 to the oncoming shift element (a holding torque capacity) and then commands a ramping pressure 204. In the late strategy, it is assumed that the oncoming shift element has been sufficiently stroked to have capacity at the time the brake pedal is applied. As such, a more aggressive ramping torque 202 can be used without affecting shift quality. In conjunction with the increased pressures to the oncoming shift element, the engine torque is also increased following application of the brake pedal is shown by ramping torques 206 and 208 that are similar to those described above with regards to FIG. 5. As can be seen, the late brake-apply strategy of this disclosure results in the ratio change occurring faster.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 7A:
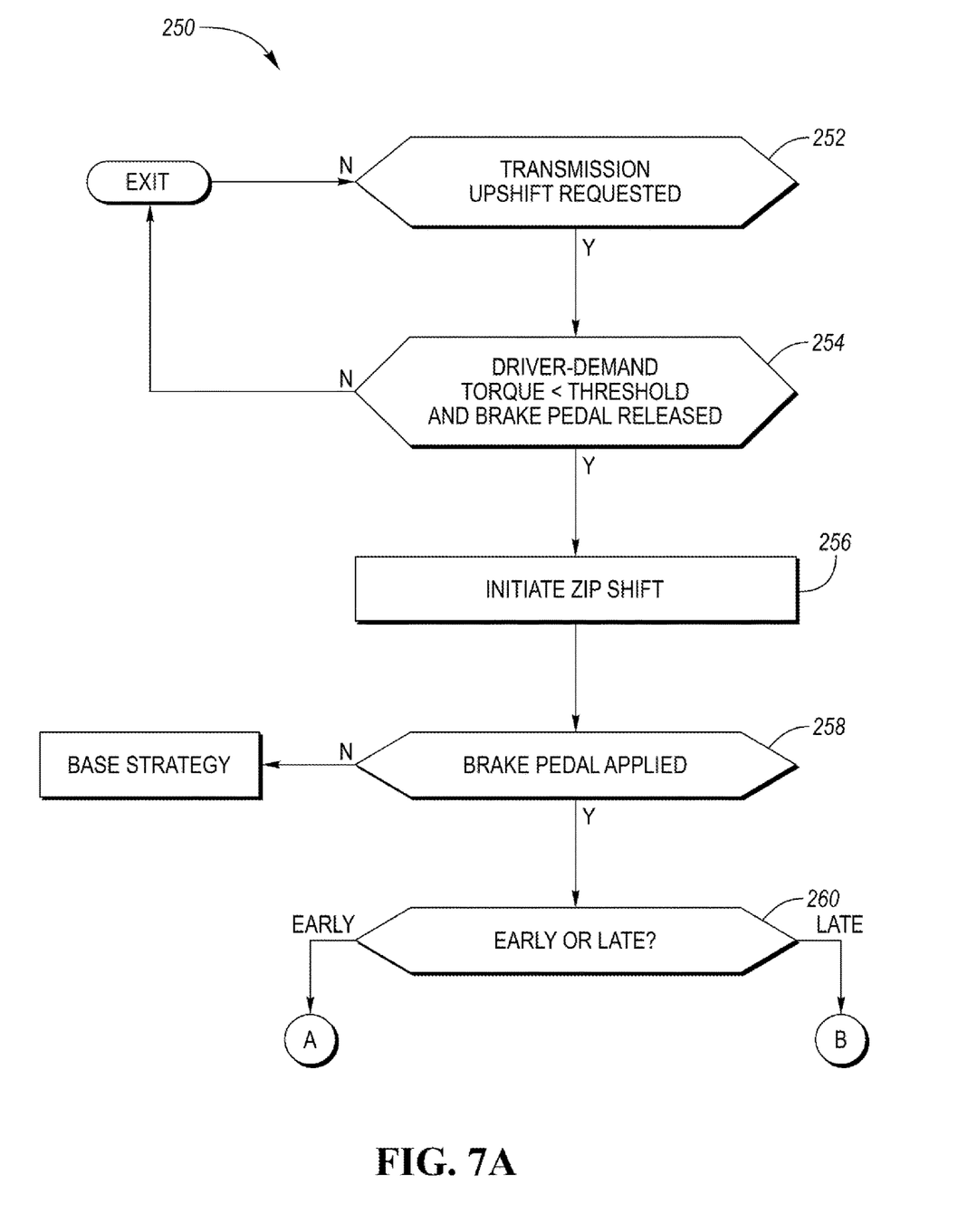
FIGS. 7A-7C show a flowchart of an algorithm for controlling a transmission during a low-input torque transmission upshift during the brake-apply use case.
Figure 7B:
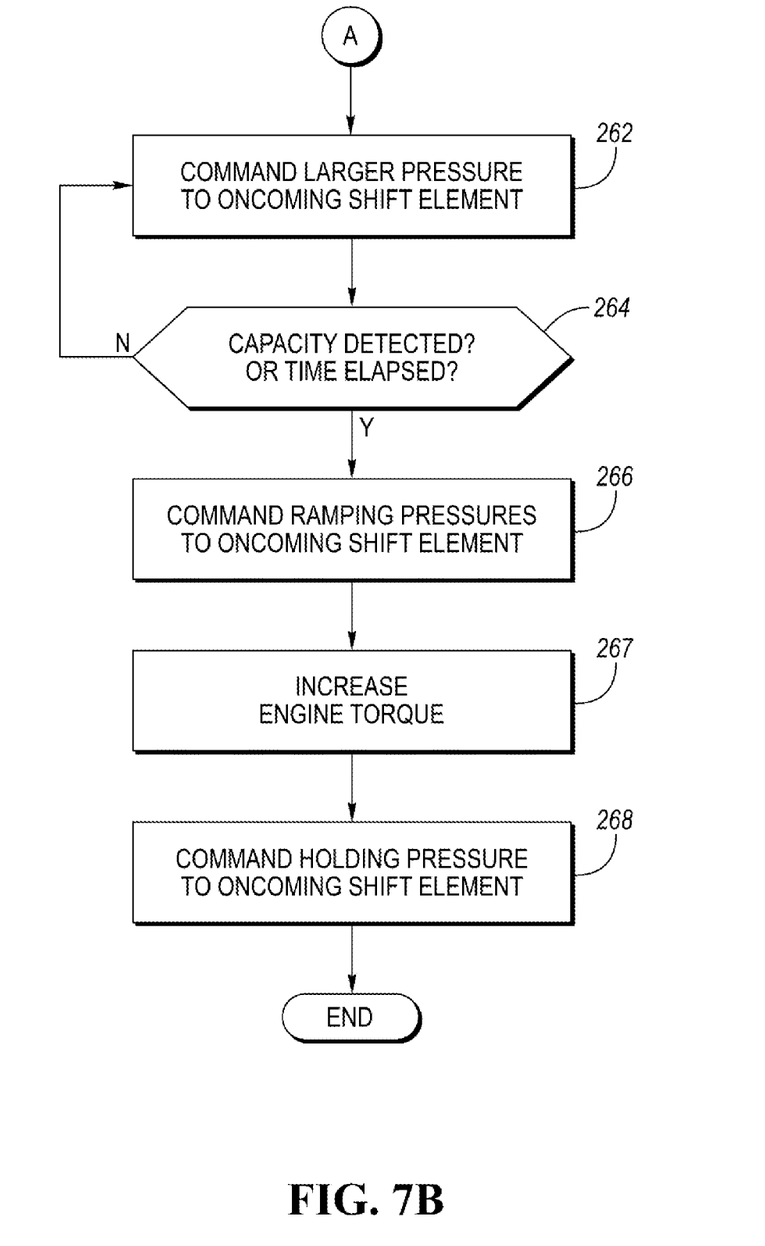
Figure 7C:
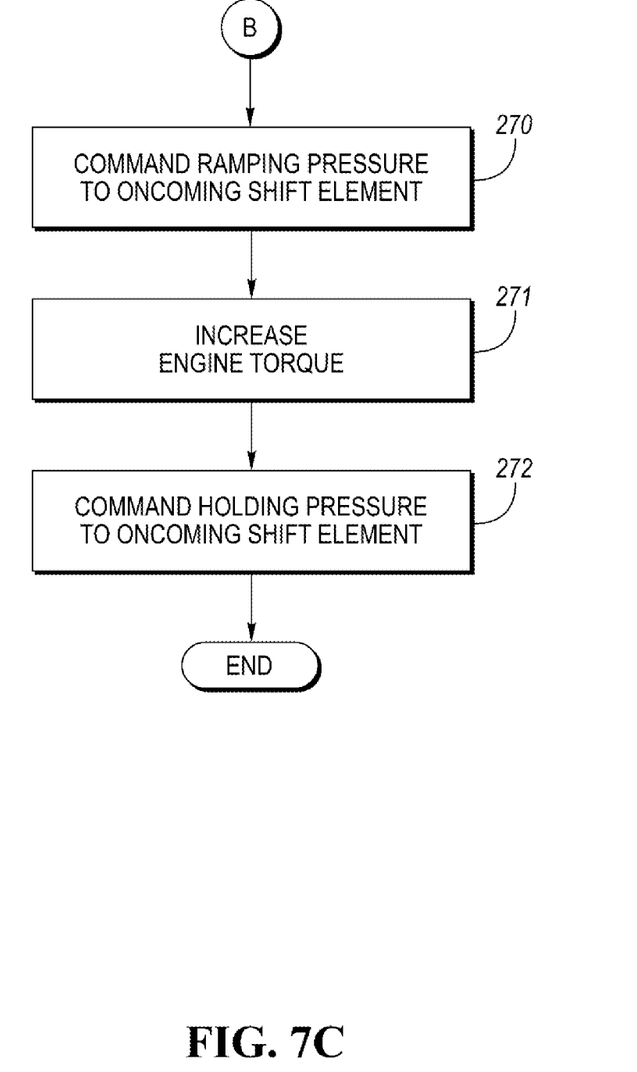

FIGS. 7A-7C show a flowchart 250 of an algorithm for controlling a transmission during a ZIP shift during the brake-apply use case. At operation 252 the controller determines if a transmission upshift has been requested. If yes, control passes to operation 254 and the controller determines if the driver-demanded torque is less than a threshold and the brake pedal is released. If no, the shift is not a ZIP shift and these controls are exited in lieu of other transmission controls. If yes at operation 254, control passes operation 256 and the controller initiates a ZIP shift. The ZIP shift is initiated by commanding a first pressure to an oncoming shift element associated with the upshift without generating torque capacity on the oncoming shift element. At operation 258, the controller determines if the brake pedal has been applied during the ZIP shift. If no, the base ZIP shift strategy is used. If yes, a brake-applied strategy is used.

The control strategy applied in response to the brake pedal being depressed during a ZIP shift depends on whether or not the brake is applied early in the shift or late in the shift. The timing early or late refers to the state of the oncoming shift element. If the brake is applied prior to the oncoming shift element being stroked, this is an early application of the brake pedal. If the brake pedal is applied after the oncoming shift element is stroked, this is a late application of the brake pedal. The controller may determine if the state of the oncoming shift element using a timer or by detecting capacity at the oncoming shift element as described above in FIG. 4.

If the brake pedal is applied early control passes to operation 262. At operation 262, the controller commands a larger pressure to the oncoming shift element to stroke the piston and increase the torque capacity of oncoming shift element to a nonzero value that still permits slip. At operation 264, the controller determines if capacity at the oncoming shift element is detected or if a predetermined time has elapsed. If no, the controller continues to command the larger pressure of operation 262. If yes, the controller commands ramping pressures to the oncoming shift element at operation 266. At operation 267, the engine torque is increased. At operation 268, the controller commands a holding pressure to the oncoming shift element after the ratio change it is complete.

If the brake pedal is applied late, then the oncoming shift element has capacity and the controller can command ramping pressures to the oncoming shift element immediately at operation 270. In operation 271, the controller increases the engine torque. In operation 272, the controller commands a holding pressure to the oncoming shift element once the ratio change has completed.

The above-described brake-apply strategy may also be used for other use cases such as engine low coolant temperature or when a transmission fault code is present. If the engine low coolant temperature or when a transmission fault code is detected early, then the early strategy is used.

Figure 8:
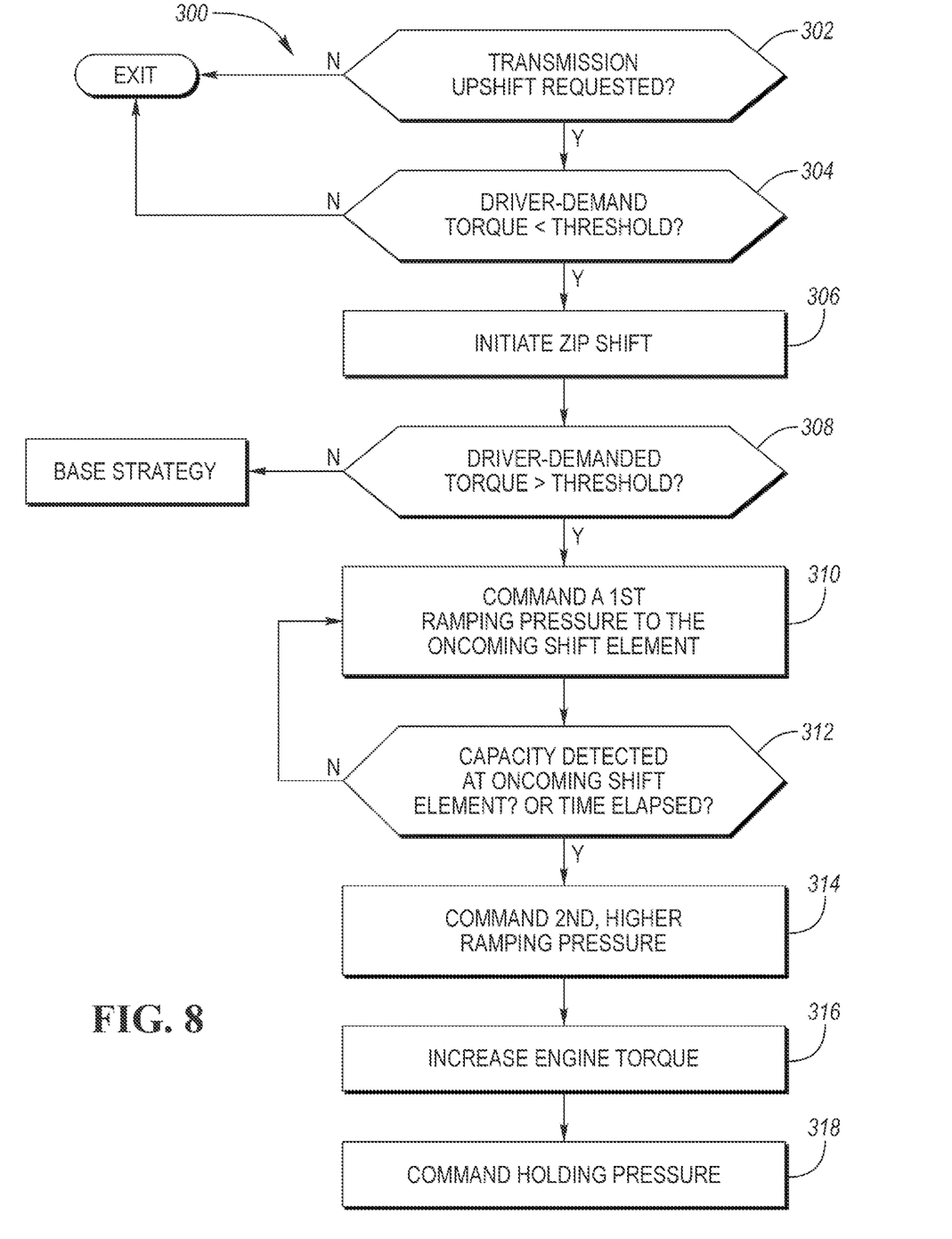
FIG. 8 is a flowchart of an algorithm for controlling a transmission during a low-input torque transmission upshift during the accelerator tip-in use case.

FIG. 8 is a flowchart 300 of an algorithm for controlling a transmission during a ZIP shift during the accelerator tip-in use case. At operation 302 the controller determines if a transmission upshift has been requested. If yes, control passes to operation 304 and the controller determines if the driver-demanded torque is less than a threshold. If no, the shift is not a ZIP shift and these controls are exited in lieu of other transmission controls. If yes at operation 304, control passes operation 306 and the controller initiates a ZIP shift. The ZIP shift is initiated by commanding a first pressure to an oncoming shift element associated with the upshift without generating torque capacity on the oncoming shift element.

At operation 308, the controller determines of the driver-demanded torque is greater than a threshold. If no, the base strategies used. If yes, the accelerator tip-in strategies used. At operation 310, the controller commands a first ramping pressure to the oncoming shift element to increase the torque capacity to a non-zero value. At operation 312, the controller determines if capacity is detected at the oncoming shift element or if a predetermined time has elapsed. The controller may look at both capacity detection and the time elapsed or may only look at one of these. If no at operation 312, the controller continues to command the ramping pressure until capacity is detected when the timer has elapsed. At operation 314, the controller commands a second higher ramping pressure to further increase the torque capacity and lock the oncoming shift element. At operation 316 the controller commands increased engine torque. The controller commands a holding pressure at operation 318 after the ratio change has occurred to fully secure the shift element from slip.

The above-described controls provide a responsive and high-quality shift even with changing conditions during a ZIP shift.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a transmission;
a brake pedal; and
a controller programmed to,
in response to an upshift of the transmission, a driver-demanded torque being zero, and the brake pedal being released, command a first pressure, that is greater than zero, to an oncoming shift element associated with the upshift such that the oncoming shift element has a torque capacity of zero,
in response to the brake pedal being applied during the upshift of the transmission, command a second, larger pressure to the oncoming shift element to increase the torque capacity to a non-zero value, and
in response to expiration of a threshold time from the brake pedal being applied, command a series of sequentially ramping pressures to the oncoming shift element to further increase the torque capacity and lock the oncoming shift element.

2. The vehicle of claim 1, wherein the non-zero value is less than a value required to lock the oncoming shift element.

3. The vehicle of claim 1, wherein the non-zero value is based on a time between initiation of the upshift and application of the brake pedal.

4. The vehicle of claim 3, wherein the non-zero value is a first value when the time is less than a threshold and is a second, larger value when the time is greater than the threshold.

5. The vehicle of claim 1, wherein the controller is further programmed to:
in response to the driver-demanded torque increasing during the upshift of the transmission, command a third, larger pressure to the oncoming shift element to increase the torque capacity to a second non-zero value, and
in response to the second non-zero value being detected, command a series of pressures to the oncoming shift element that sequentially increase to further increase the torque capacity and lock the oncoming shift element.

6. The vehicle of claim 1, wherein the controller is further programmed to, in response to an engine coolant temperature being less than a threshold during the upshift of the transmission, command a third pressure to the oncoming shift element to increase the torque capacity to a second non-zero value.

7. The vehicle of claim 1, wherein the controller is further programmed to, in response to an engine coolant temperature being less than a threshold during the upshift of the transmission, command a fourth pressure to the oncoming shift element to increase the torque capacity to a non-zero value.

8. A vehicle comprising:
an engine;
a transmission; and
a controller programmed to:
during an upshift of the transmission when a driver-demanded torque is zero, command a first pressure to an oncoming shift element associated with the upshift without generating torque capacity on the oncoming shift element,
in response to the driver-demanded torque increasing during the upshift of the transmission, command a second, larger pressure to the oncoming shift element to increase the torque capacity to a non-zero value, and
in response to the non-zero value being detected, command a series of pressures to the oncoming shift element that sequentially increase to further increase the torque capacity and lock the oncoming shift element.

9. The vehicle of claim 8, wherein the controller is further programmed to, in response to the driver-demanded torque becoming greater than zero during the upshift of the transmission, command a negative torque to the engine until the non-zero value is detected, and then, increase torque commanded to the engine.

10. The vehicle of claim 9, wherein the controller is further programmed to, in response to the non-zero value being detected, command a positive torque to the engine.

11. The vehicle of claim 8, wherein the controller is further programmed to operate the engine to produce a negative torque regardless of the driver-demanded torque.

12. The vehicle of claim 8, wherein the non-zero value is detected when a difference between a commanded torque capacity of the oncoming shift element and an estimated torque capacity of the oncoming shift element is less than a threshold.

13. The vehicle of claim 8, wherein the non-zero value is detected when an estimated torque capacity of the oncoming shift element exceeds a threshold.

14. The vehicle of claim 8, wherein the non-zero value is detected when a commanded torque capacity of the oncoming shift element exceeds a threshold.

15. The vehicle of claim 8, wherein the non-zero value is detected when a commanded torque capacity of the oncoming shift element exceeds a torque of an input shaft of the transmission.

16. The vehicle of claim 8, wherein the controller is further programmed to:
in response to a brake pedal being applied during the upshift of the transmission, command a third, larger pressure to the oncoming shift element to increase the torque capacity to a second non-zero value, and
in response to expiration of a threshold time from the brake pedal being applied, command a series of sequentially ramping pressures to the oncoming shift element to further increase the torque capacity and lock the oncoming shift element.

17. A vehicle comprising:
a transmission;
a brake pedal; and
a controller programmed to:
in response to an upshift of the transmission, a driver-demanded torque being zero, and the brake pedal being released, command a stroke pressure to an oncoming shift element associated with the upshift such that the oncoming shift element has a torque capacity of zero,
in response to the brake pedal being applied during the upshift of the transmission, command another pressure to the oncoming shift element to increase the torque capacity to a non-zero value, and
in response to a difference between an estimated torque capacity of the oncoming shift element and the non-zero value being less than a threshold, command yet another pressure, that is larger than the another pressure, to the oncoming shift element to further increase the torque capacity and lock the oncoming shift element.

18. The vehicle of claim 17, wherein the controller is further programmed to:
set the non-zero value to a first magnitude when the brake pedal is applied before the oncoming shift element is stroked, and
set the non-zero value to a second, greater magnitude when the brake pedal is applied after the oncoming shift element is stroked.

19. The vehicle of claim 17, wherein the controller is further programmed to:
set the non-zero value to a first magnitude when a time between incitation of the upshift and the brake pedal being applied is less than a time threshold, and
set the non-zero value to a second, greater magnitude when the time is greater than the time threshold.

20. The vehicle of claim 17, wherein the non-zero value is less than a value required to lock the oncoming shift element.

* * * * *